United States Patent [19]
Nakamura et al.

[11] Patent Number: 5,235,591
[45] Date of Patent: Aug. 10, 1993

[54] STACK TYPE OPTICAL DISC APPARATUS, SEALED AND SEPARATE TYPE OPTICAL HEAD THEREFOR AND OPTICAL DISC MEDIUM

[75] Inventors: Shigeru Nakamura, Tachikawa; Eiichi Seya, Hachioji; Seiichi Mita, Kanagawa; Masuo Kasai, Nishinomiya; Masahiro Ojima, Tokyo; Hiroshi Yasuoka, Fujisawa; Motoyasu Terao; Yoshinori Miyamura, both of Tokyo; Takeshi Nakao, Sagamihara; Kiyoshi Matsumoto, Kokubunji; Yoshihiro Hamakawa, Koganei, all of Japan

[73] Assignee: Hitachi, Ltd., Tokyo, Japan

[21] Appl. No.: 641,309

[22] Filed: Jan. 15, 1991

[30] Foreign Application Priority Data

Jan. 19, 1990 [JP] Japan .................................. 2-008236
Mar. 20, 1990 [JP] Japan .................................. 2-068348

[51] Int. Cl.⁵ ........................ G11B 21/02; G11B 33/14
[52] U.S. Cl. ................................ 369/199; 360/97.02; 369/283; 369/13
[58] Field of Search ...................... 369/195, 199, 44.11, 369/44.23, 44.24, 13; 250/226, 227; 360/59, 66, 97.02, 114; 346/244, 256

[56] References Cited

U.S. PATENT DOCUMENTS 3,416,150 12/1968 Lingberg, Jr. .................... 360/97.02
3,876,842 4/1975 Bouwhuis ............................ 369/109
3,916,121 10/1975 Stuzzi ................................. 369/27 X (List continued on next page.)

FOREIGN PATENT DOCUMENTS 6048806 10/1985 Japan .
6122448 1/1986 Japan .
61-104338 5/1986 Japan .
6265287 3/1987 Japan ................................ 360/97.02

OTHER PUBLICATIONS

"Japanese Journal of Applied Physics" vol. 26, 1987, pp. 117 to 120 of the supplement.
"National Technical Report", vol. 35, No. 2, Apr., 1989, pp. 67 to 73.
"Applied Optics" vol. 26, No. 13, Jul. 1, 1987, pp. 2549 to 2553.
"Japanese Journal of Applied Physics" vol. 26, 1987, pp. 155 to 159 of the supplement.

Primary Examiner—Eugene R. LaRoche
Assistant Examiner—Michael C. Kessell
Attorney, Agent, or Firm—Antonelli, Terry Stout & Kraus

[57] ABSTRACT

A separation type optical head according to the present invention includes at least a light source portion for emitting collimated beams, a focusing device (a focusing lens) for focusing the collimated beams onto an information recording surface of an optical disc medium, a focal point control mechanism for the position of the spot on the information recording surface, and a photo-detection portion for receiving beams reflected by the information recording surface. The structure is divided into a fixed portion including the light source portion and the photo-detection portion and a movable portion including the focusing device (focusing lens) and the focal point control mechanism. At least the movable portion of the separation type optical head is movably accommodated n a frame (sealing case) for the optical head so as to prevent irregular vibrations of the movable portion due to high speed air flows or turbulence. Furthermore, a focal point control mechanism of an air float type may be employed in the movable portion of the separation type optical head so as to actively utilize the high speed air flow generated due to the rotation of the disc medium to perform a rough adjustment of the focal point of the focusing device.

34 Claims, 11 Drawing Sheets

U.S. PATENT DOCUMENTS

| | | | |
|---|---|---|---|
| 4,115,808 | 9/1978 | Miyaoka | 369/44.11 X |
| 4,293,944 | 10/1981 | Izumita et al. | 369/44.23 |
| 4,489,356 | 12/1984 | Farmer | 369/72 X |
| 4,568,142 | 2/1986 | Iguma | 369/44.16 X |
| 4,571,718 | 2/1986 | Cahill et al. | 369/291 |
| 4,633,450 | 12/1986 | Gueugnon | 360/114 |
| 4,725,721 | 2/1988 | Nakamura et al. | 369/44.24 |
| 4,750,152 | 6/1988 | Yonekubo et al. | 369/13 X |
| 4,754,446 | 6/1988 | Reno | 369/13 X |
| 4,788,421 | 11/1988 | Ogawa et al. | 369/44.11 X |
| 4,807,204 | 2/1989 | Mizutani et al. | 369/13 |
| 4,837,757 | 6/1989 | Okada et al. | 369/43 X |
| 4,862,440 | 8/1989 | Miyamoto et al. | 369/112 X |
| 4,873,679 | 10/1989 | Murai et al. | 369/44.11 X |
| 4,888,751 | 12/1989 | Yoshimaru et al. | 369/199 X |
| 4,926,403 | 5/1990 | Tsuyuguchi et al. | 369/199 X |
| 4,926,409 | 5/1990 | Tsuyuguchi et al. | 369/199 X |
| 4,959,820 | 9/1990 | Horimai et al. | 369/13 |
| 4,983,440 | 1/1991 | Ikeda et al. | 369/288 X |
| 5,013,635 | 5/1991 | Ohkawa et al. | 346/135.1 X |
| 5,086,422 | 2/1992 | Hagiya et al. | 360/97.02 |

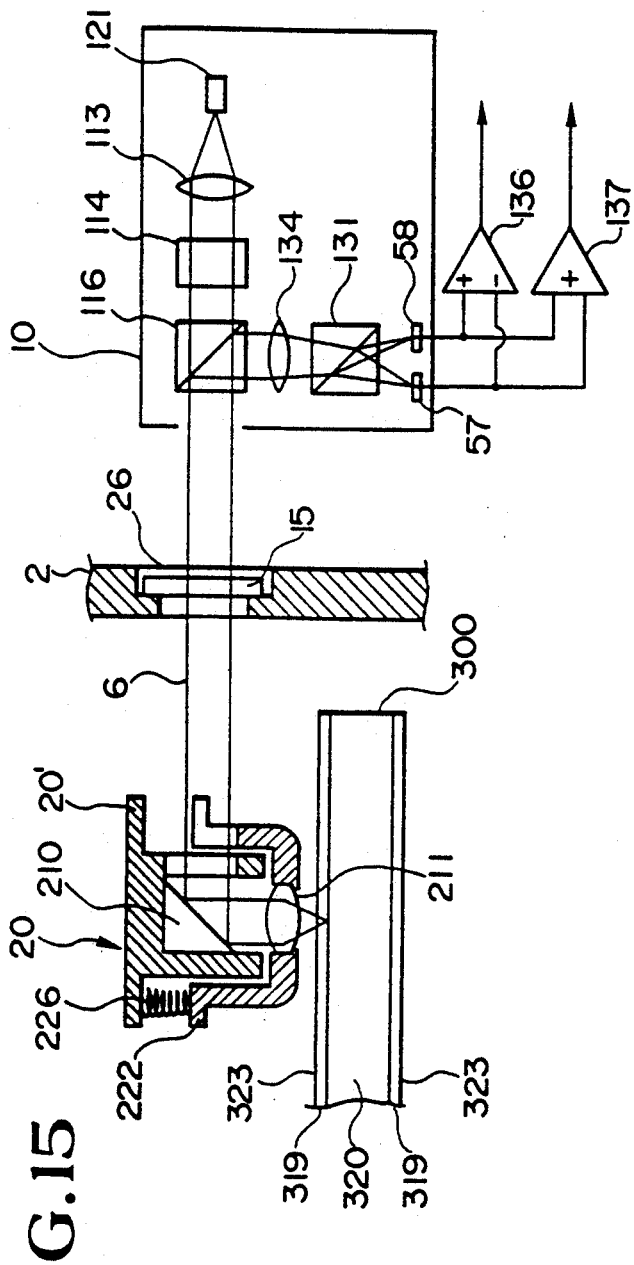
FIG.15
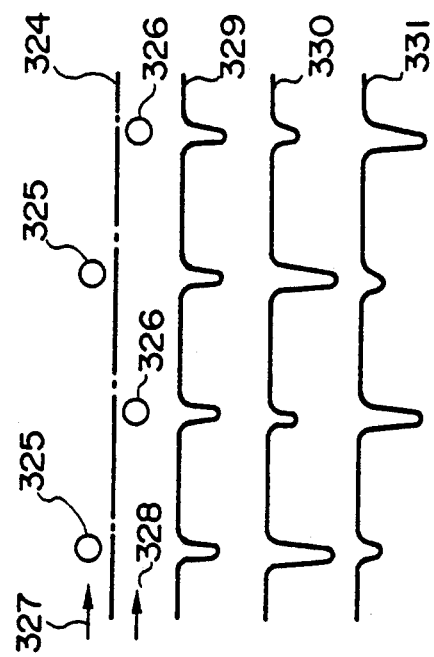
FIG.16A
FIG.16B
FIG.16C
FIG.16D

STACK TYPE OPTICAL DISC APPARATUS, SEALED AND SEPARATE TYPE OPTICAL HEAD THEREFOR AND OPTICAL DISC MEDIUM

BACKGROUND OF THE INVENTION

The present invention relates to an optical information storage apparatus capable of recording, reproducing or erasing information by utilizing light irradiation. More particularly, the present invention relates to a stack type optical disc apparatus including a plurality of stacked optical disc mediums which is capable of easily raising the density and enlarging the capacity; to a sealed type separation optical head therefore; and to an optical disc medium (information recording medium).

In accordance with the progress of the information-oriented society, a data file apparatus having a large capacity has been desired. Therefore, there has been known a stack type optical disc apparatus serving as a large capacity data file apparatus capable of meeting the above-described desire. The stack type optical disc apparatus is arranged in such a manner that a plurality of optical disc mediums are simultaneously rotated by a spindle, whereby information is recorded/reproduced/erased by an optical head disposed to confront each of the recording surfaces of the optical discs. Since a large quantity of information items must be stored in the above-described stack type optical disc apparatus, there arises a necessity of further shortening the access time in which information is retrieved by the optical head. Furthermore, the thickness of the optical head must be reduced and the intervals between the discs must also be reduced so as to reduce the dimension of the stack type optical disc in the direction of the spindle.

It is preferable that a separation type optical head disclosed, for example, in Japanese Patent Unexamined Publication No. 61-22448 or Japanese Patent Unexamined Publication No. 61-104338 be employed in order to shorten the access time. The above-disclosed separation type optical head has been arranged in such a manner that the optical head is divided into a fixed portion including a light source portion and a detection portion and a movable portion including a focusing lens and an actuator for controlling the spot position. Furthermore, only the movable portion is moved by a voice coil motor.

The access time, in a case of a structure arranged in such a manner that the separation type optical head is employed, can be shortened in comparison to the conventional integrated type optical head arranged in such a manner that the overall body of the optical head is moved. The reason for this lies in that the weight of the separation type optical head can be reduced since the number of the parts constituting the movable portion can be reduced.

As for the reduction of the thickness of the optical head, a structure capable of reducing the thickness of the optical head has been disclosed in, for example, "Japanese Journal of Applied Physics", Vol. 26, 1987, p.p. 117 to 120 of the supplement. According to this structure, a thin type optical head having a height of 10 mm has been realized wherein an aspheric single lens and a 2-dimensional lens (2-D lens) actuator are employed. Another thin type optical head has been disclosed in "National Technical Report", Vol. 35, No. 2, April 1989, p.p. 67 to 73.

However, all of the above-described separation type optical heads respectively disclosed in Japanese Patent Laid-Open Nos. 61-22448 and 61-104338 and the thin type optical heads respectively disclosed in "Japanese Journal of Applied Physics", Vol. 26, 1987, p.p. 117 to 120 of the supplement, and "National Technical Report", Vol. 35, No. 2, April 1989, p.p. 67 to 73 are respectively arranged to be employed in an optical disc apparatus of a type having one optical disc so as to record/reproduce information. The optical disc medium for use in an optical disc apparatus of the type described above is usually accommodated in a disc cartridge made of, for example, plastic for the purpose of protecting the disc. When the optical disc medium is loaded into the optical disc apparatus together with the disc cartridge, the optical disc medium is rotated at high speed in the disc cartridge. Furthermore, an opening formed in the disc cartridge is partially opened so that laser beams are applied to the surface of the optical disc medium from the optical head. As a result, information recording/reproducing is performed. In the disc cartridge, although air tends to rotate together with the optical disc medium which rotates at high speed, no high speed air flow is generated since the air is surrounded by the stationary disc cartridge. Furthermore, the air flow does not flow from the disc cartridge. Therefore, no special means has been necessary to eliminate the influence of the high speed air flow generated due to the high speed rotation of the optical disc medium.

SUMMARY OF THE INVENTION

A first object of the present invention is to provide a stack type optical disc apparatus having a separation type optical head which is divided into a fixed portion including a light source portion and a photo-detection portion and a movable portion including a focusing lens and a spot position control mechanism and which is therefore suitable to realize high speed access, the stack type optical disc apparatus being suitable to realize high density and large capacity.

A second object of the present invention is to provide a separation type optical head from which irregular vibrations of a movable portion generated due to a high speed air flow and a turbulence generated when the optical disc medium is rotated can be eliminated and to provide a stack type optical disc apparatus which uses the same.

A third object of the present invention is to provide a separation type optical head which uses a focal point control mechanism of an air float type which positively utilizes a high speed air flow generated due to the rotation of the optical disc medium and which has a small and light movable portion and to provide a stack type optical disc apparatus which uses the same.

A fourth object of the present invention is to provide a separation type optical head capable of preventing deterioration in performance of position control of the optical head and the optical performance due to dust in the air and eliminating an influence of heat generated in the electronic circuit parts and to provide a stack type optical disc apparatus which uses the same.

A fifth object of the present invention is to provide a thin type optical disc medium (information recording medium) which can be effectively employed in a stack type optical disc apparatus.

The optical disc apparatus according to the present invention uses, as its optical head, a separation type optical head which is divided into a fixed portion including a light source portion and a photo-detection portion and a movable portion including focusing means (a focusing lens) and a spot position control mechanism.

A stack type optical disc apparatus has been disclosed in U.S. patent application Ser. No. 07/407,798 for recording, reproducing or erasing information by an optical head disposed to confront each of the recording surface of the optical discs by simultaneously rotating a plurality of optical disc mediums by one spindle.

In order to reduce the size of the stack type optical disc apparatus, the interval between optical disc mediums must be shortened. Therefore, the stack type optical disc apparatus according to the present invention is arranged in such a manner that a plurality of optical disc mediums are not accommodated in a cassette but are directly secured to the spindle so as to be rotated. The cross section of the space interposed between the optical disc mediums has the form of a rectangle. Since the space is substantially surrounded by the optical disc medium and the spindle, air in the surrounded space rotates together with the optical disc medium when the optical disc medium and the spindle rotate at high speed. As a result, a high speed air flow is generated. Therefore, the optical head disposed in the above-described space is influenced by the high speed air flow, causing the operation of the movable portion of a separation type optical head, more particularly the operation of a lens actuator serving as the focal point control mechanism, to become unstable. For example, in a stack type optical disc apparatus arranged in such a manner that a 10-inch optical disc medium is rotated at 3600 rpm, the linear speed of the optical disc medium becomes 40 m/second. Therefore, air in a space interposed between optical disc mediums, for example, air in a small space of about 12 mm, is rotated together with the optical disc medium due to the viscosity of the air. As a result, the operation of the lens actuator of the optical head movable portion becomes unstable since it receives an air flow of a speed of 40 m/second, causing a problem in that the spot position cannot be accurately controlled. What is even worse, the air flow having a speed of 40 m/second comes in contact with the lens actuator, causing turbulence to be generated. As a result, another problem arises in that irregular vibrations are imparted to the lens actuator.

The separation type optical head according to the present invention includes at least a light source portion for emitting parallel beams, focusing means (a focusing lens) for focusing the parallel beams onto an information recording surface of an optical disc medium, a focal point control mechanism for controlling the spot focused by the focusing means to be positioned onto the information recording surface, and a photo-detection portion for receiving beams reflected by the information recording surface. The structure is divided into a fixed portion including the light source portion and the photo-detection portion and a movable portion including the focusing device (focusing lens) and the spot focal point control mechanism.

According to one aspect of the present invention, at least the movable portion of the separation type optical head is movably accommodated in an optical head frame (sealed case) so as to prevent irregular vibrations of the movable portion generated due to a high speed air flow or turbulence generated when the optical disc medium is rotated. A window is formed in a surface of the optical head frame confronting the information medium in a direction in which the movable portion can be moved. As a result, the spot focused by the focusing means can be applied to the recording surface of the optical disc medium through the above-described window. Since the optical head frame is surrounded, entry of high speed air flows, turbulence, and dust into the optical head frame can be prevented. Therefore, gaps in the lens actuator and a space between the guide shaft and the bearing for moving the optical head movable portion can be protected from dust in the air. Furthermore, the accumulation of dust in the air into the gaps of the optical parts can be prevented and the deterioration in the transmissivity of the optical parts can thereby be prevented.

The fixed portion including the light source portion and the photo-detection portion may be accommodated in the optical head frame in addition to the movable portion. In this case, the air flow generated due to the disc rotation can be utilized to radiate heat generated from the electronic circuit parts. In a portion adjacent to the optical head, electronic circuit parts such as a laser diode and a laser drive amplifier which generate heat are disposed. The temperature gradient realized due to the heat generated from the electronic circuit parts becomes steep in accordance with the size reduction of the optical head and the optical disc apparatus. Therefore, the optical parts can easily be displaced and the electronic circuit parts can easily be broken. The conventional large-size optical disc apparatus employs a cooling fan so as to radiate the above-described heat. However, the small-size optical disc apparatus having no place at which the cooling fan can be fastened encounters a problem in terms of heat emitted from the electronic circuit parts.

According to another aspect of the present invention, a permeable aperture is formed in the side surface of the optical head frame and a filter is fastened to the hole through which air can be introduced into the optical head frame. Therefore, cold air outside the optical head frame can be introduced into the optical head frame through the permeable aperture formed in the side surface of the optical head frame. As a result, heat generated in the electronic circuit parts can be radiated outside the optical head frame through another permeable aperture. Furthermore, since the filter fastened to the aperture through which the air outside the optical head frame can be introduced into the optical head frame filters dust in the air, entry of dust from outside of the optical head frame can be prevented. Furthermore, since the above-described filter also acts to adjust the flow of air introduced into the optical head frame, generation of turbulence in the optical head frame can be prevented. In the case where the separation type optical head according to the present invention is used in the stack type optical disc apparatus, the separation type optical head is disposed between a plurality of optical disc mediums which are simultaneously rotated so as to confront each of the recording surfaces of the optical disc mediums and the separation type optical heads are independently driven.

According to another aspect of the present invention, an air-float type focal point control mechanism is employed in the movable portion of the separation type optical head so as to actively utilize the high speed air flow generated due to the rotation of the optical disc medium. The focusing is controlled by a rough followup control and a fine followup control. The rough followup control is performed in such a manner that a focusing lens of the movable portion of the separation type optical head is floated by an air flow generated due to the rotation of the optical disc. The fine followup control is performed by utilizing the automatic focusing effect of the laser wavelength change type or performed in such a manner that a relay lens optical system is disposed in the fixed portion of the separation type optical head and any one of the lenses is moved in the direction of the optical axis. As a result, the movable portion of the optical head can be composed of optical parts omitting the actuator.

First, the rough followup control of the focal point control mechanism will be described. The interval between the optical disc and the movable portion can be maintained substantially constant by arranging the movable portion of the separation type optical head to be an air floating type. For example, when the disc is rotating at constant speed, the above-described interval becomes substantially constant. However, the interval is changed due to the warp of the head by a degree depending upon the air floating response performance. When the disc is rotated at a constant speed the linear speed becomes different in accordance with the radial position at which the movable portion of the separation type optical head is disposed as well as the above-described change due to the warp of the head. As a result, the floating height is changed. For example, the floating height at the outer periphery of the disc becomes about 1.4 times that at the innermost portion of the same. However, since the floating height is deviated in a range of several microns which is sufficiently smaller than the floating height, the deviation can be reduced to a level smaller than the focal depth of the focusing lens by performing a slight fine followup control.

Next, the fine followup control will be described. The fine followup control is a control ranging below several microns and it is exemplified as follows.

First, it is exemplified by a method in which the automatic focusing effect in accordance with the wavelength change of the laser diode is utilized. The automatic focusing effect in accordance with the wavelength change of the laser diode is an automatic focusing phenomenon realized due to a fact that an external resonant system is formed between the rear end portion of the laser diode and the recording surface of the optical disc, to the chromatic aberration of the lens system and to the fact that the spectrum of the laser diode is widened. The autofocusing technology utilizing the laser wavelength change has been disclosed in U.S. Pat. No. 4,725,721 and in "Applied Optics", Vol. 26, No. 13 pp. 2549-2553, 1987. Since the control range is about 10 microns, it can preferably be utilized to perform the fine followup control. A second method is a method in which any of the relay lens optical systems disposed in the fixed portion is moved. In this case, a lens having a small NA (Numerical Aperture) can preferably be employed.

In a case where a fluid dynamic control technology for floating the movable portion of the optical head is employed, a problem arises in terms of a head crash due to dust. That is, there arises a fear of damage to the surface of the optical disc and the movable portion of the optical head by dust introduced into the air flow layer.

According to another aspect of the present invention, focusing means such as a focusing lens, fluid dynamic control means for the air floating type focus control mechanism, moving means such as an access mechanism for moving the focusing means in the radial direction of the optical disc and the optical disc medium are disposed in a sealed case. Furthermore, the movable portion of the separation type optical head and the optical disc medium are relatively movably accommodated. In this case, since the optical disc medium is also sealed in the case, the thickness of the protection layer formed on the recording film of the optical disc medium can be reduced.

The size of the light spot determined in accordance with the diffraction limit is in inverse proportion to the NA (Numerical Aperture) of the focusing lens (objective lens). Therefore, a focusing lens (objective lens) having a large NA must be used in order to form small recording marks (pits or magnetized domains). However, the NA of the objective lens of a conventional recording medium cannot be enlarged over a certain value ($NA=0.6$ at present), the conventional recording medium being structured in such a manner that an optical spot is applied to the recording film via a glass plate or an acrylic substrate having a thickness of about 1.2 mm. The reason for this lies in that the thickness of the large NA lens becomes too large and the operation distance between the optical disc medium and the objective lens therefore is reduced excessively. Another reason lies in that a variety of aberrations, more particularly, a coma aberration, is generated due to the inclination of the disc or the like.

In the sealed stack type optical disc apparatus according to the present invention, the entry of dust having a large particle size can be prevented. Therefore, the glass or acrylic cover the thickness of which is about 1 mm can be replaced by a very thin protection layer. As a result, the operation distance can be elongated by about 1 mm. Therefore, an objective lens having a larger NA the degree of which corresponds to the above-described elongation can be used. Furthermore, since the aberration is in proportion to the thickness of the protection film, the aberration can significantly be reduced. In addition, optical disc mediums having a small warp can selectively be loaded to the apparatus. Therefore, the coma aberration can be reduced. As a result, a large NA objective lens can be used and the optical beam can therefore be diaphragmed to a small size in comparison to a conventional interchangeable optical disc apparatus.

Still further advantages of the present invention will become apparent to those of ordinary skill in the art upon reading and understanding the following detailed description of the preferred and alternate embodiments.

BRIEF DESCRIPTION OF THE DRAWINGS

FIG. 15 illustrates an example of the structure of a separation type optical head and a window formed in a sealed case for use in the sealed stack type optical disc apparatus shown in FIG. 13;

FIGS. 16A to 16D illustrate the operation of the tracking mark (prewobble mark) formed on the recording surface of the optical disc medium;

The invention will be described in conjunction with the drawings which are for the purpose of illustrating the preferred and alternate embodiments of the invention only, and not for the purpose of limiting the same.

DETAILED DESCRIPTION OF PREFERRED AND ALTERNATE EMBODIMENTS

Figure 1:
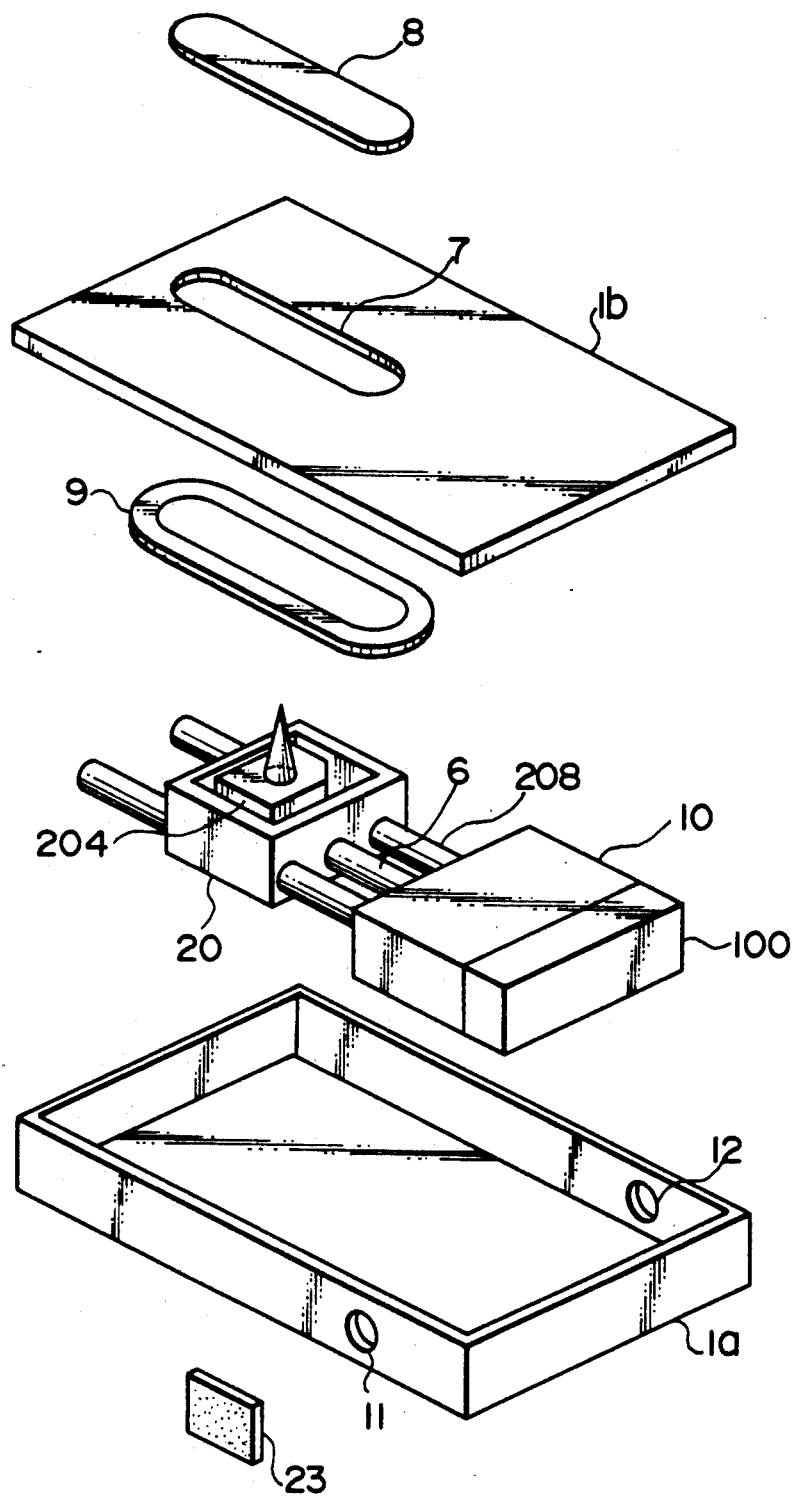
FIG. 1 is an exploded perspective view which illustrates an embodiment of a separation type optical head according to the present invention.
Figure 2:
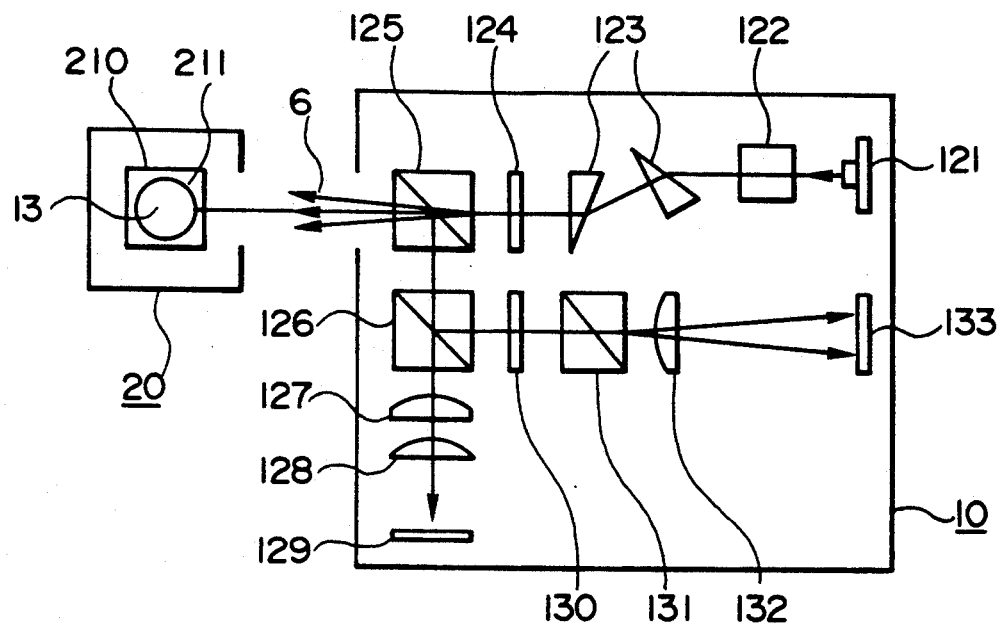
FIG. 2 is a plan view which illustrates an example of the structure of a fixed optical system (fixed portion)

FIG. 1 is an exploded perspective view which illustrates an embodiment of a separation type optical head according to the present invention. Referring to the drawing, an optical head is accommodated in a head frame comprising a box 1a and a cover 1b. A fixed optical system 10 and an electronic circuit portion 100 are secured to the inside portion of the box 1a. Furthermore, a movable optical system 20 is movably accommodated in the box 1a together with a drive device (omitted from the illustration). An example of the structure of the fixed optical system 10 and that of the movable optical system 20 are shown in FIG. 2. In the fixed optical system 10, a divergent laser beam emitted from a laser diode 121 is collimated by a collimator lens 122. Then, the collimated beam is, by two beam shaping prisms 123, converted to have an isotropically distributed intensity with respect to the axis. In a diffraction grating 124, the above-described collimated beam is divided into zero-order diffracted light, +1-order diffracted light and −1-order diffracted light. Three diffraction beams thus divided pass through a beam splitter 125 and are emitted from the fixed optical system 10 before they are incident upon the movable optical system 20. Referring to the drawing, collimated laser beams represented by reference numeral 6 are respectively composed of the above-described three diffraction beams.

Figure 3:
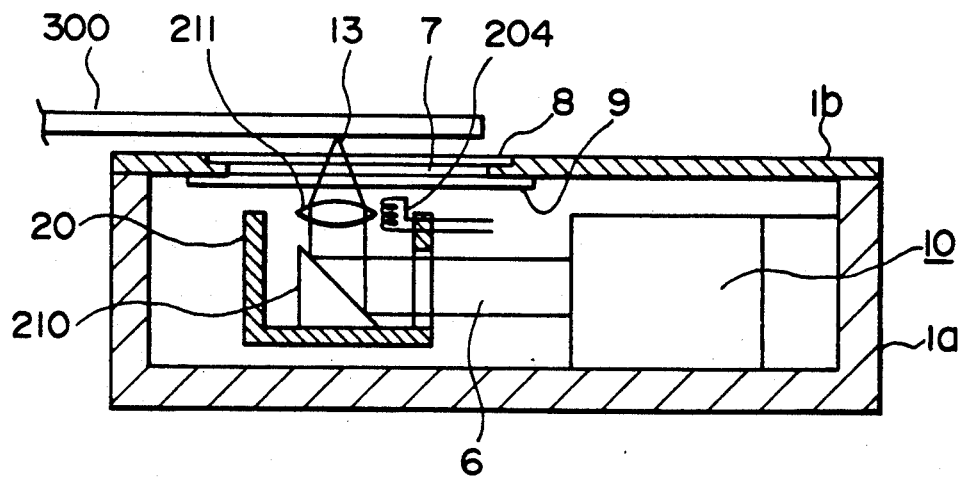
FIG. 3 is a vertical cross sectional view which illustrates an example of the structure of a movable optical system (movable portion)

FIG. 3 is a vertical cross sectional view which illustrates the separation type optical head according to the present invention. The collimated laser beams 6 emitted from the fixed optical system 10 are reflected by a mirror 210 disposed in the movable optical system 20. Then, the collimated laser beams are, focused on a recording surface of an optical disc medium 300 to form a spot 13 via an opening 7 formed in the head frame to which a glass plate 8 is fastened, the collimated laser beams being focused by a focusing lens 211 fastened to a 2-D lens actuator 204. Beams from the spot 13 reflected by the disc 300 are returned to the fixed optical system 10 after they have passed through the movable optical system 20. The beams are then reflected by the beam splitter 125 so that portiond of the beams pass through a beam splitter 126 before they are focused by a convex lens 127 and a cylindrical lens 128. Thus, the focused beams are received by a separation type photo-detector 129. According to this embodiment, spot position control signals such as a focal point detection signal and a track deviation detection signal are obtained from the separation type photo-detector 129. The direction of polarization of the beam reflected by the beam splitter 126 shown in FIG. 2 is rotated by 45 degrees by a half-wave plate 130 before it is divided into two linear polarization components by a Wollaston prism 131. These components are focused by a convex lens 132 before the convergent light is received by a separation type photo-detector 133. According to this embodiment, a photo-electromagnetic signal is detected from the separation type photo-detector 133 by a difference detection method.

Figure 4:
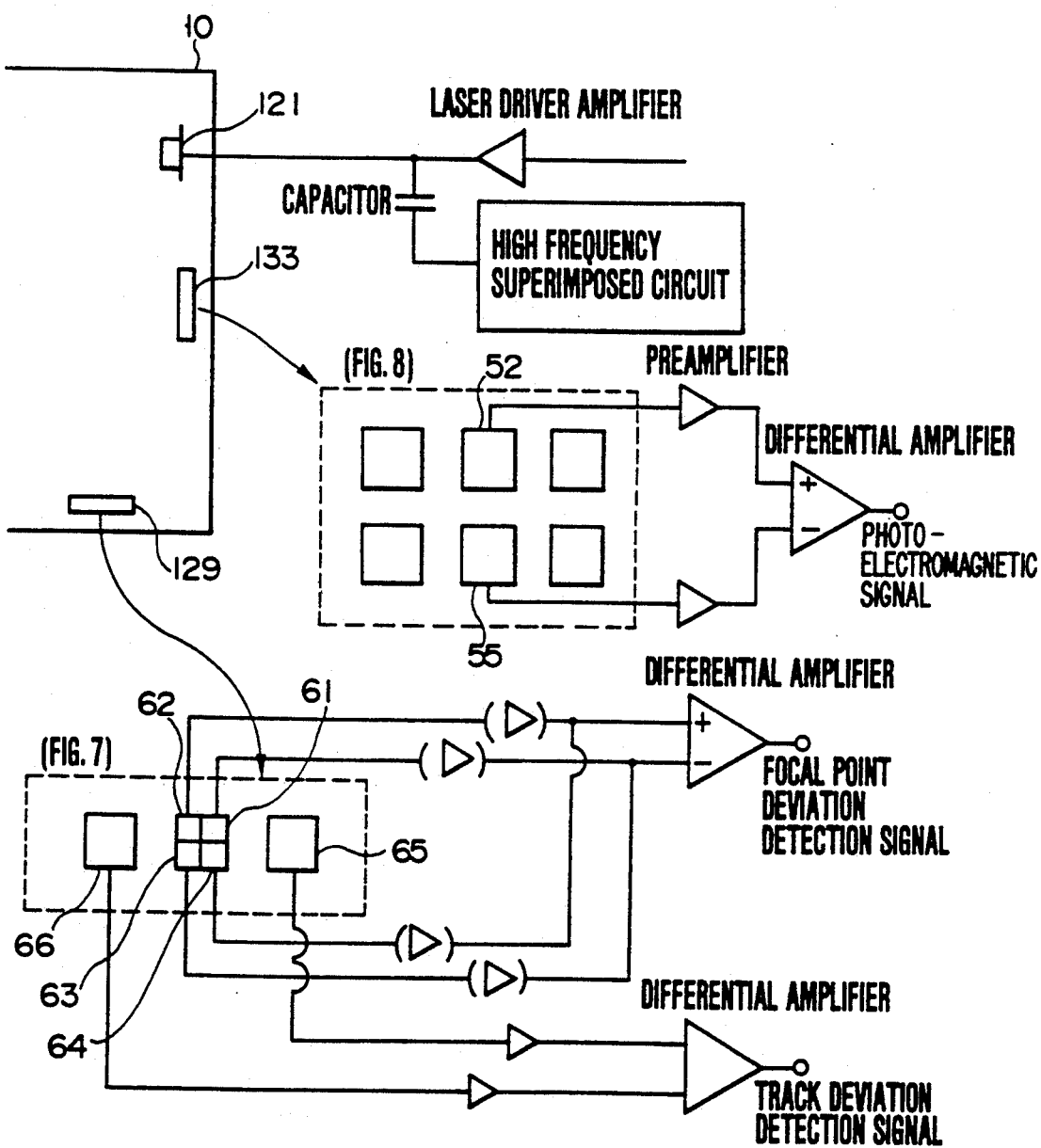
FIG. 4 illustrates an example of the structure of an electronic circuit portion such as a photo-detector in the separation type optical head shown in FIG. 1.

As shown in FIG. 4, the electronic circuit portion 100 has a substrate on which, for example, a laser driver amplifier for driving the laser diode 121 and a high frequency superimposed circuit for eliminating laser noise are mounted. Furthermore, the substrate has, on the surface thereof, preamplifiers for converting an output current from each of the photo-detectors and a variety of operation amplifiers for obtaining a data reproduction signal, a focal point deviation detection signal and a track deviation detection signal from the corresponding photo-detection signals converted into voltage signals by the above-described preamplifiers.

Figure 5:
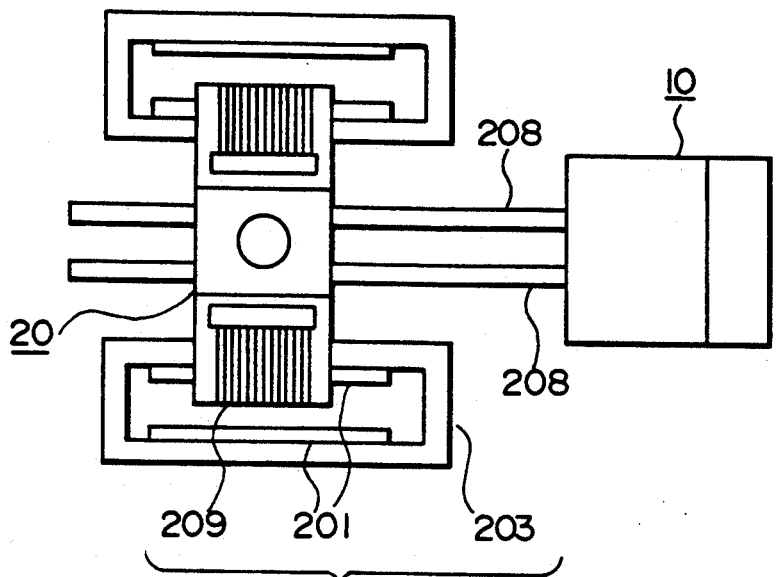
FIG. 5 illustrates an example of the structure of an access mechanism for moving the movable optical system (movable portion) in the radial direction of the optical disc.

Two shafts 208 are fastened to the fixed optical system 10 so that the movable optical system 20 is able to move along the shafts 208 in the axial direction of the shafts 208 by an action of a voice coil type linear motor 200, as shown in FIG. 5 which is a plan view, comprising a magnet 201, a yoke 203 and a coil 209.

As shown in FIG. 1, a cover 1b of the head frame has the elongated opening 7 formed along the direction of the movement of the movable optical system 20, the glass plate 8 being fastened to the opening 7.

An annular coil 9, which is elongated in the direction of the movable optical system 20, is fastened to the reverse side of the cover 1b so as to surround the opening 7. As a result, a desired magnetic field is applied to the spot irradiation region of the optical disc medium 300 for the purpose of recording/erasing information. According to this embodiment, the fixed optical system 10 is, together with the movable optical system 20, accommodated in the box 1a so as to be sealed in the head frame by the cover 1b. The box 1a has, on the side surfaces thereof, two openings 11 and 12 confronting each other, a filter 23 being fastened to at least the opening 11 of the two openings 11 and 12, the opening 11 confronting an air flow produced by the rotating optical disc medium 300. As the filter 23, for example, a paper filter or a glass wool filter made of glass fiber may be employed. Dust contained in air existing outside the head frame is filtered by the filter 23 before the air is introduced into the head through the opening 11 so that the electronic circuit portion 100 is cooled. Then, the air is discharged outside the head frame through the opening 12.

Figure 6:
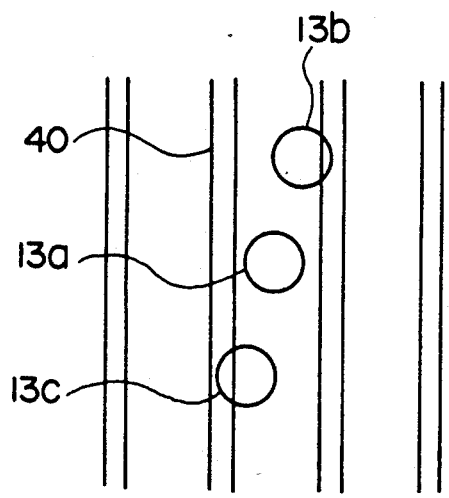
FIG. 6 illustrates spots on the recording surface of the optical disc medium.

FIG. 6 illustrates the spot 13 formed on the recording surface of the optical disc medium 300, where reference numeral 40 represents a guide groove which has previously been manufactured in the recording surface of the optical disc medium 300. Since the collimated laser beams 6 are composed of three diffraction beams, the spot 13 is composed of a main spot 13a formed by the zero-order diffracted light and sub-spots 13b and 13c respectively formed by the +1-diffracted light and the −1-diffracted light.

Figure 7:
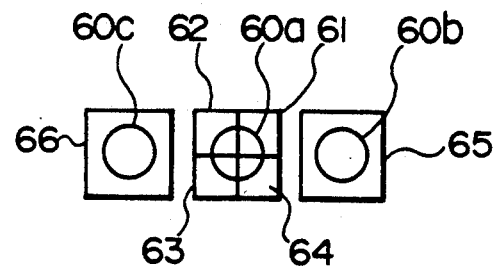
FIG. 7 illustrates an example of the structure of a separation type photo-detector for detecting a position control signal for the light spot.

FIG. 7 illustrates the shape of the devices in the light receiving portion of the separation type photo-detector 129. According to this embodiment, the astigmatism method is employed for detecting the focal point deviation. The sum of the output signals from devices 61 and 63 of a quadrature light receiving portion and the sum of the output signals from devices 62 and 64 are differentially calculated, the quadrature light receiving portion receiving a beam 60a reflected from the main spot 13a. A differential signal denoting the above-described sum becomes the focal point deviation signal. The focal point deviation signal is received by a 2-D lens actuator 204 disposed in the movable optical system 20. The focusing lens 211 is then moved in the direction of the optical axis so that the focusing control is performed. A method of detecting the focal point deviation by using the astigmatism method has been disclosed in, for example, U.S. Pat. No. 4,293,944. The track deviation is detected in accordance with a three-spot method. The difference signal obtained by differentially calculating the output signals from light receiving devices 65 and 66 which receive corresponding reflected beams 60b and 60c of sub-spots 13b and 13c becomes a track deviation detection signal. The thus obtained track deviation detection signal is received by the 2-D actuator 204. When the focusing lens 211 is then moved in the radial direction of the disc 300, the tracking control can be performed. The 3-spot tracking method has been disclosed in, for example, U.S. Pat. No. 3,876,842.

Figure 8:
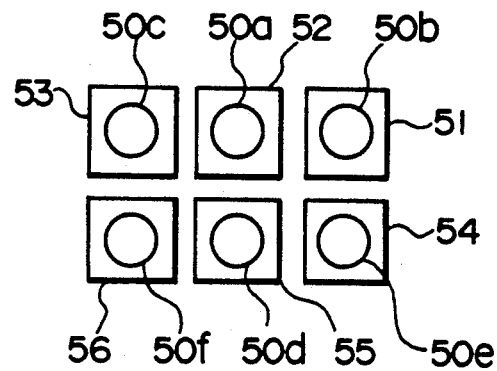
FIG. 8 illustrates an example of the structure of the separation type photo-detector for detecting a photoelectromagnetic signal.

FIG. 8 illustrates the shape of the devices of a light receiving portion of the separation type photo-detector 133. Beams 50a and 50d are the reflected beams of the main spot 13a divided by the Wollaston prism 131. Beams 50b and 50e are the reflected beams of the sub-spot 13b divided by the Wollaston prism 131, while beams 50c and 50f are the reflected beams of the sub-spot 13c. The direction of polarization of each of the beams 50a, 50b and 50c and the direction of polarization of each of the beams 50d, 50e and 50f are perpendicular to one another. The photo-electromagnetic signal can be formed in response to a differential signal obtained by differentially calculating the output signal from a light receiving device 52 which receives the beam 50a and the output signal from a light receiving device 55 which receives the beam 50d.

The information recording can be performed by forming a domain magnetized in the reverse direction to the direction of that of the environment, the domain being formed in such a manner that the laser diode 121 is subjected to a pulse modulation in accordance with information to be recorded while passing an electric current to the coil 9 shown in FIG. 1 and applying a vertical magnetic field with respect to the recording surface of the disc 300. Information thus recorded can be erased by applying an electric current to the coil 9 in the inverse direction to that at the time of the recording operation so that a vertical magnetic field is applied in the inverse direction. Then, the laser diode 121 is caused to linearly emit light at a large output while maintaining the application of the above-described vertical magnetic field.

Figure 9:
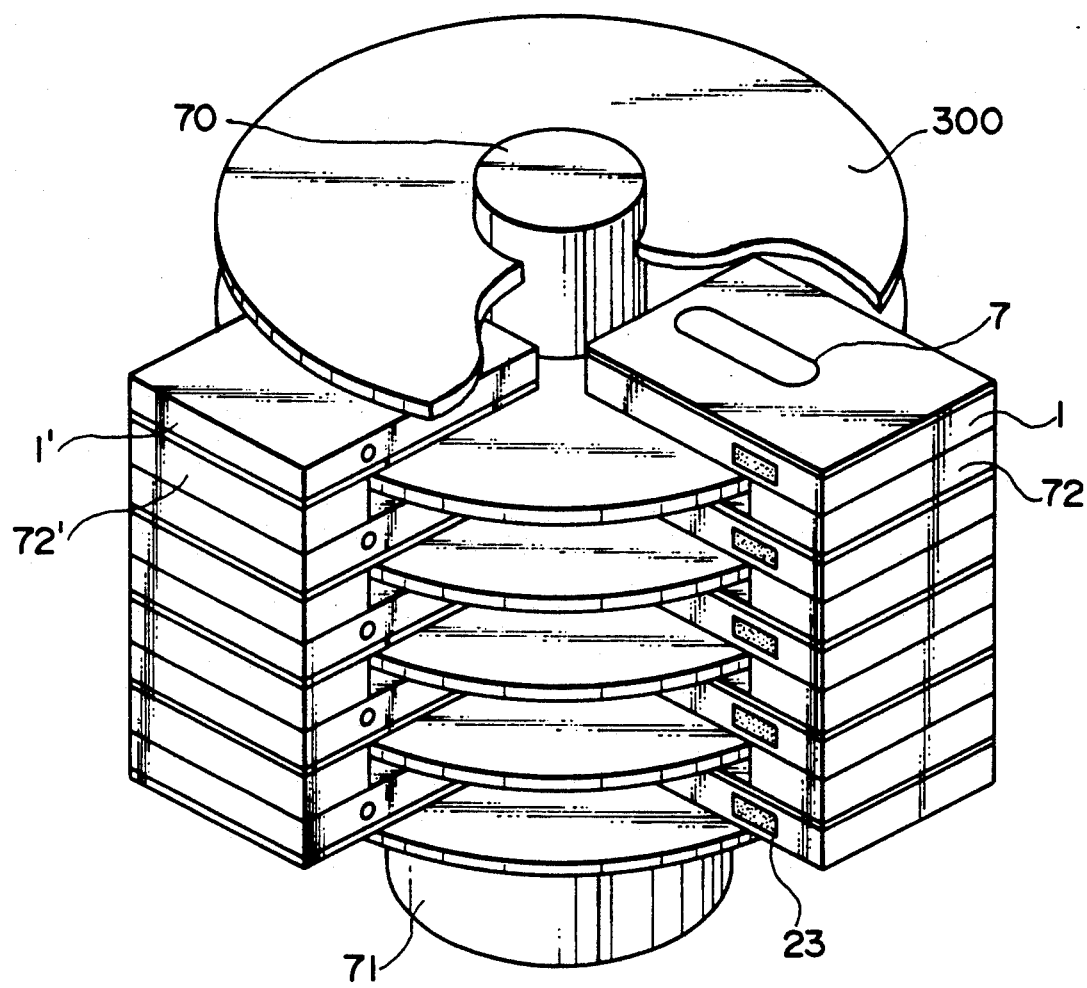
FIG. 9 illustrates an embodiment of a stack type optical disc according to the present invention using the separation type optical head shown in FIG. 1.

FIG. 9 illustrates an embodiment arranged in such a manner that the separation type optical head 1 shown in FIG. 1 is employed in a stack type optical disc apparatus. For example, six 10-inch optical disc 300 are fastened to a spindle 70 at intervals of 12 mm so as to be rotated at 3600 rpm. Five optical heads 1 are respectively arranged via spacers 72 in such a manner that the openings 7 face upwards so that information is recorded/reproduced from the recording surface formed on the lower surface of the optical disc 300. Five optical heads 1' are respectively arranged via spacers 72' in such a manner that the openings 7 face downwards so that information is recorded/reproduced from the recording surface formed on the upper surface of the optical disc 300. Since the fixed optical system 10 and the movable optical system 20 of each of the optical heads 1 are enclosed in the head frame, the influence of external high speed air flows or turbulent flows can be prevented. Furthermore, an adhesion of external dust can be prevented.

According to this embodiment, a separation type optical head can be obtained which is capable of preventing irregular vibrations of the lens actuator generated due to high speed air flows or turbulent flows in a stack type optical disc apparatus or the like and the deteriorations in the control performance and the optical performance of the optical head due to dust in air. Therefore, an optical disc apparatus which can further stably be operated can be obtained. Although the description is made about a case as shown in FIG. 9 in which the separation type head is employed in a stack type optical disc apparatus. The separation type head according to the present invention is not limited to the stack type optical disc apparatus. A significant effect can also be obtained from a structure in which the separation type head is employed in a disc-interchangeable optical disc apparatus.

Figure 10:
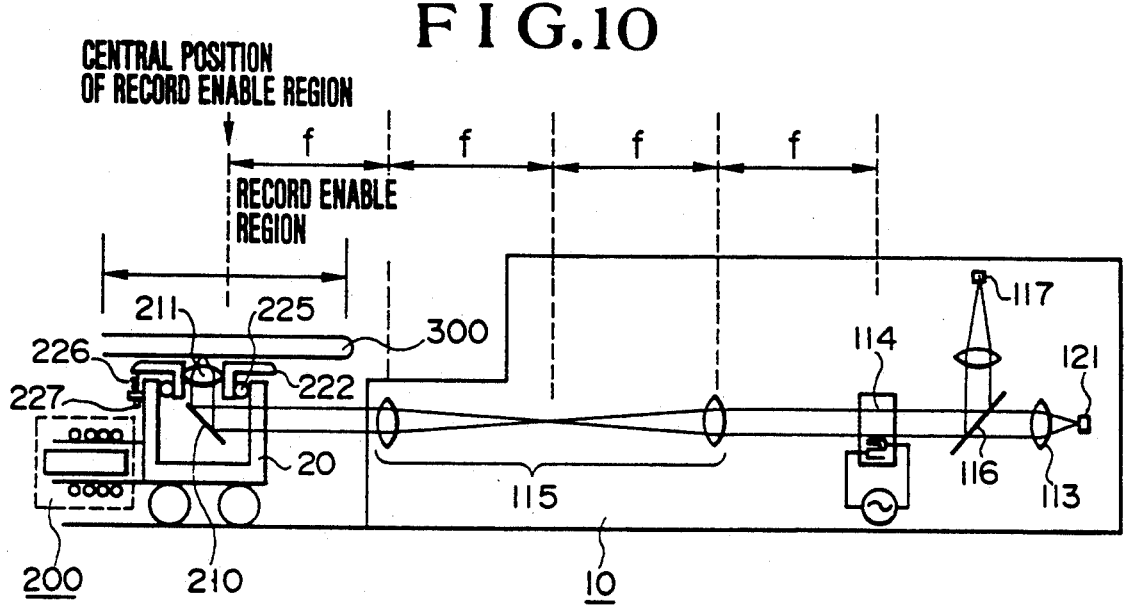
FIG. 10 is a structural view which illustrates another embodiment of the separation type optical head according to the present invention.

Another embodiment of the separation type optical head according to the present invention will be described with reference to FIG. 10. FIG. 10 illustrates an example of the structure of a separation type optical head for use in a compact disc apparatus, a video disc apparatus, a phase change or aperture reloadable optical disc apparatus and a phase change type reversible optical disc apparatus. The separation type optical head according to this embodiment is, similarly to the above-described separation type optical head, composed of the fixed optical system 10 and the movable optical system 20. According to this embodiment, the fixed optical system 10 comprises the laser diode 121, the collimator lens 113, a beam splitter 116, an AO deflector 114, a relay lens optical system 115 and a track error signal detection and data signal detection photo-detector 117. According to this embodiment, the collimator lens 113 has an aperture arranged properly so that the intensity of elliptic beams emitted from the laser diode 121 are converted to be distributed isotropically. Although the beam shaping prism 123 is not used according to this embodiment, the beam shaping prism 123 may be employed.

On the other hand, the movable optical system 20 according to this embodiment comprises a rising mirror 210, a focusing lens 211 and a air-float type focal point control mechanism comprising an air-float type slider 222, a bearing 225, a urging spring 226 and a urging quantity adjustment screw 227. The movable optical system 20 is moved to a desired track by the linear motor 200 in the radial direction of the disc 300.

In the fixed optical system 10, beams emitted from the laser diode 121 are converted into parallel beams by the collimator lens 113. The parallel beams pass through the beam splitter 116 before the direction of the travel of the parallel beams is changed by the AO deflector 114 so as to obtain a small deviation of the optical spot at the time of the tracking control or the seeking operation. The AO deflector 114 is a non-mechanical type actuator so that it is capable of performing a high speed access. According to this embodiment, the tracking error signal can be subjected to a wobbling offset correction by using an AO deflector disclosed in U.S. patent application Ser. No. 07/406,735. The offset correction can further efficiently be performed in the separation type optical head according to this embodiment. Therefore, the contents of the disclosure in U.S. patent application Ser. No. 07/406,735 are included within the present invention as a reference.

The relay lens optical system 115 is disposed to cause the angular change in the AO deflector 114 to be generated at the central position of the recording region in the disc radial direction for the purpose of extremely reducing the shading of the beams by the focusing lens 211 in the movable optical system 20.

In the movable optical system 20, the parallel beams passed from the fixed optical system 10 are vertically deflected by the rising mirror 210 or a rectangular prism 210. The parallel beams thus deflected are diaphragmed on a recording film of the optical disc 300 by the focusing lens 211 so that a small spot is formed. The focusing lens 211 is movably fastened to an air-float slider 222 in the vertical direction. The focusing lens 211 is floated at the outer periphery of the disc 300 by a height of 5 $\mu$m to 20 $\mu$m from the surface of the disc 300. In this case, the quantity of the change in the height of the float becomes 10 $\mu$m or less. The range of the change in the wave length which can be oscillated by the semiconductor 121 is arranged to be about 20 nm or more and the quantity of chromatic aberration of the focusing lens 211 is arranged to be 0.5 $\mu$m/nm or more so that a fine followup control can be performed by utilizing an automatic focusing effect in accordance with the laser wave length followup technology. If the height of the air float is arranged to be 8.5 $\mu$m or less, recording/reproducing of information can be performed since the quantity of the change in the float at the outer periphery of the disc 300 becomes smaller than the focus depth of 2.5 $\mu$m even if a laser beam the wave length of which is 780 nm is diaphragmed by the focusing lens 211 the NA of which is 0.55.

The apparatus according to this embodiment reproduces information by detecting, by the photo-detector 117, the intensity of reflected light modulated by recording marks such as information pits. Information is recorded in the aperture reloading type optical disc apparatus in such a manner that apertures are formed in the recording film by laser beams the levels of which are higher than the reproduction level. In the phase-change type reversible optical disc apparatus, information is overwritten by applying laser beams of two levels exceeding the reproduction level.

As the optical disc medium 300 serving as the information recording medium, the photo-electromagnetic disc medium shown in FIG. 1 may be employed as well as the reloading type optical disc medium and reversible phase change optical disc medium. In this case, it is preferable that the overwrite enable photo-electromagnetic disc medium be employed. For example, a medium using a two-layered photo-electro-magnetic film has been disclosed in Proceeding of the International Symposium on Optical Memory, Japanese Journal of Applied Physics, 26, 1987, supplement, 26-4, P. 155. Furthermore, a magnetic field modulation overwrite method has been disclosed in Japanese Patent Publication No. 60-48806. The overwriting medium in accordance with the magnetic field modulation method may be employed as the optical disc medium 300. In a case of the overwrite enable two-layered photo-electromagnetic film, an erasing magnet is disposed on the same plane as the optical head with respect to the disc. Furthermore, a recording magnet is secured to the air-float slider 222 of the movable optical system of the optical head.

Figure 11:
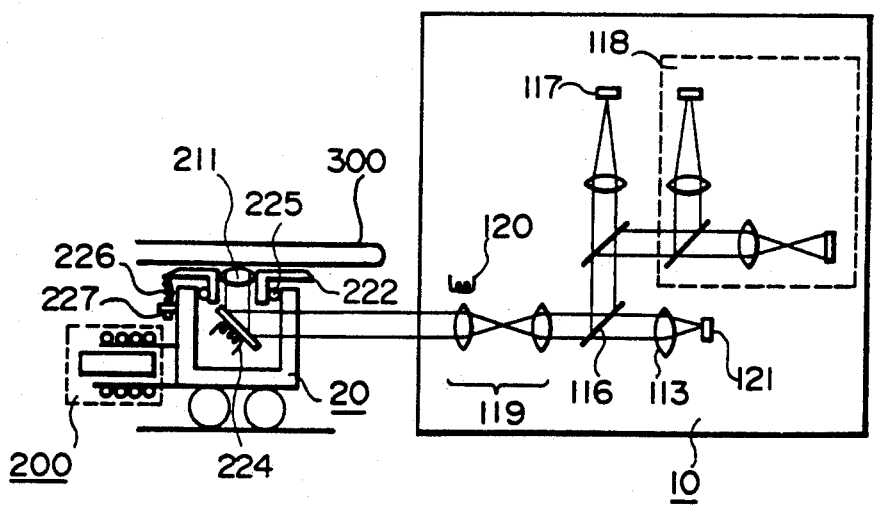
FIG. 11 illustrates a modification to the separation type optical head shown in FIG. 10 and illustrates another example of the structure of the fixed optical system (fixed portion)

FIG. 11 illustrates a modification to the separation type optical head shown in FIG. 10 and another example of the structure of the solid optical system. The laser beams emitted from the laser diode 121 in the fixed optical system 10 are made to be parallel beams by the collimator lens 113. Then, the parallel beams are, via the beam splitter 116, temporarily imaged by the relay lens optical system 119 at least either of the lens systems of which is movable (for example, by the voice coil 120) in the direction of the optical axis before they are again made to be parallel beams. The parallel beams emitted from the fixed optical system 10 are raised in the vertical direction of the optical disc 300 by a galvano mirror 224 disposed in the movable optical system 20 before they are focused on the recording surface of the optical disc 300 of the focusing lens 211 secured to the air-float slider 222. The beams reflected by the optical disc 300 are taken by the beam splitter 116 so that a focal error signal is detected by a focal point detection system 118. Furthermore, the data reproduction signal and the track error signal are detected by the photo-detector 117. When the movable lens system in the relay lens optical system 119 is moved by, for example, the voice coil 120 in response to the focal point error signal, the parallelization of the beams are slightly changed so that the fine followup control of the automatic focusing is performed. The arrangement in which the automatic focusing is roughly followup controlled by utilizing the air float is the same as that according to the embodiment shown in FIG. 10. According t this embodiment, the tracking control is performed by moving the galvano mirror 224 in response to the track error signal. However, another structure may be employed in which the AO deflector 114 is used as an alternative to the galvano mirror 224 similarly to the embodiment shown in FIG. 10. Furthermore, the AO deflector 114 is operated in response to the track error signal so as to perform the track followup control.

It is preferable that the numerical aperture NA of the collimator lens for use in the relay lens optical system be arranged to be 0.05 to 0.5 since the change in the height of float is about 10 μm. As a result, the moving stroke of the collimator lens can be made to be 100 μm or less in the direction of the optical axis so that the structure of this type can easily be employed. When the structure is arranged in such a manner that a 2-D actuator is used to serve as the actuator 120 for driving the relay lens optical system so as to cause it to perform the track followup control as well as the fine followup control of the automatic focusing, the galvano mirror 224 of the movable optical system 20 shown in FIG. 11 can be replaced by the rising mirror 210. As a result, a structure similar to the movable optical system 20 shown in FIG. 10 can be formed. Therefore, the mechanical drive device can be omitted from the movable optical system.

Figure 12:
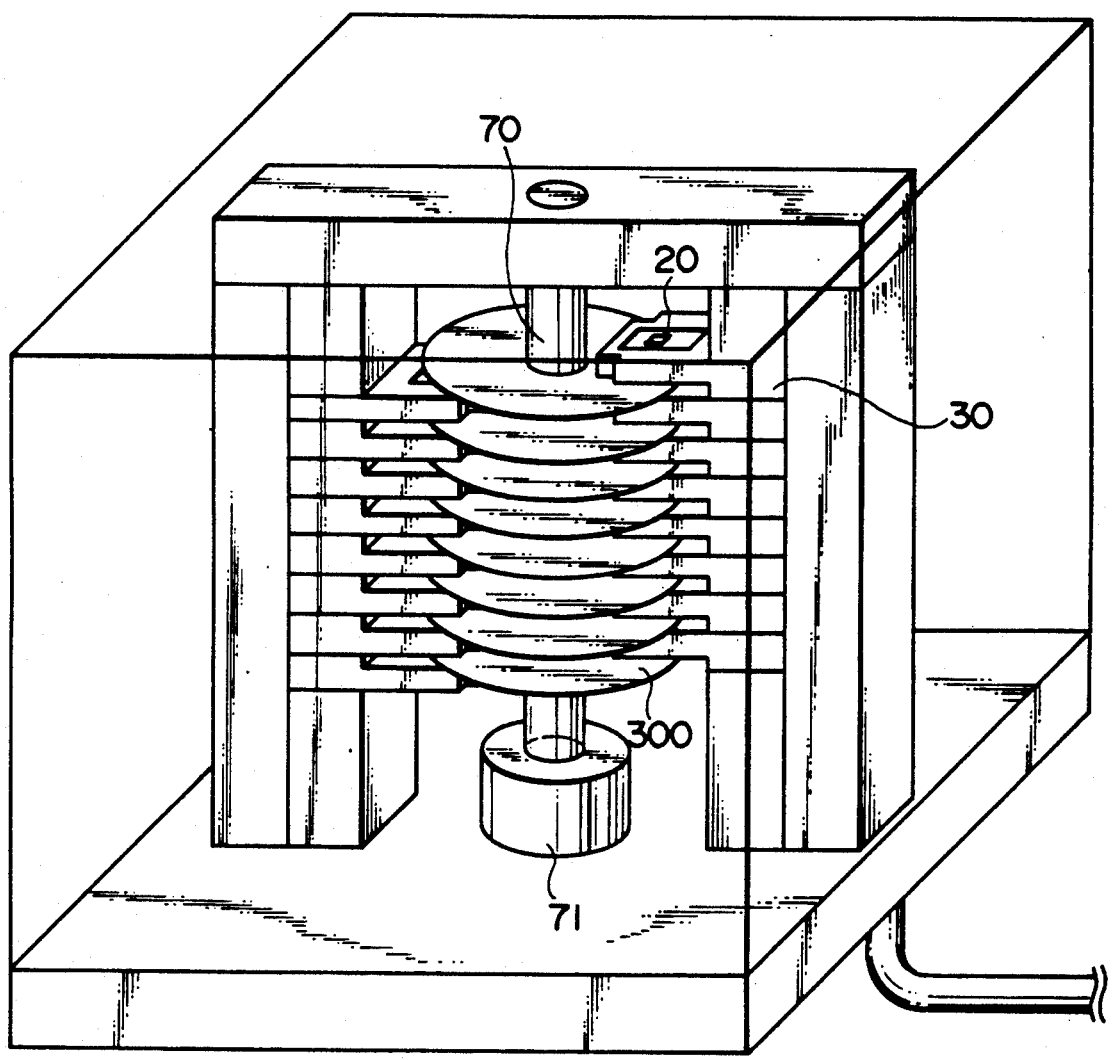
FIG. 12 illustrates an embodiment of a stack type optical disc apparatus according to the present invention using the separation type optical head shown in FIG. 10 or 11.

FIG. 12 illustrates an embodiment arranged in such a manner that the separation type optical head shown in FIG. 10 or 11 is applied to a stack type optical disc apparatus. A plurality of optical disc mediums 300 are secured to a spindle 70 so as to be rotated by a spindle motor 71. Furthermore, optical heads 30 are disposed to confront the recording surface of each of the optical disc mediums 300. As described above, the optical heads 30 each comprise the fixed optical system 10 and the movable optical system 20.

Figure 13:
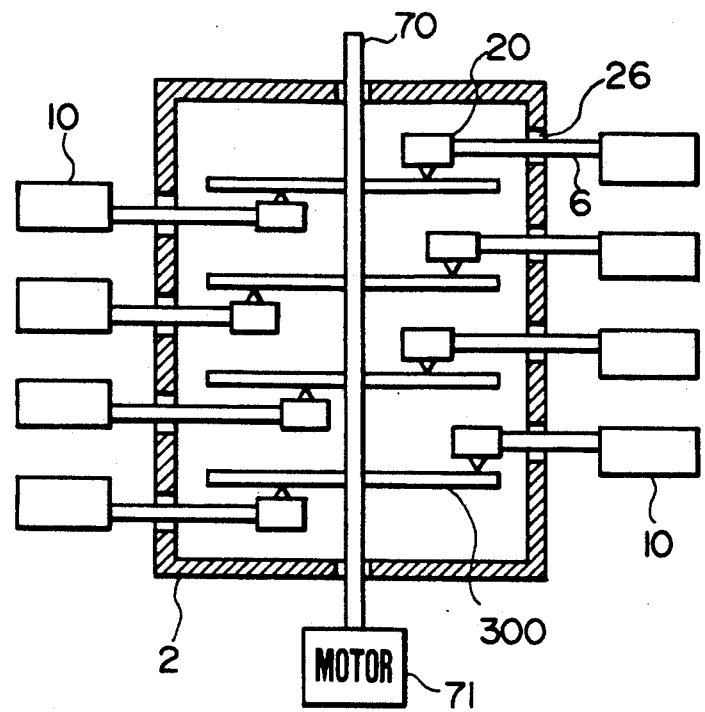
FIG. 13 illustrates an embodiment of a sealed stack type optical disc apparatus according to the present invention.

Then, an embodiment of the stack type optical disc apparatus will now be described with reference to FIGS. 13 to 15. FIG. 13 illustrates the schematic structure of a sealed stack type optical disc apparatus. A sealing case 2 accommodates, for example, four optical disc mediums 300 respectively fastened to the spindle 70 and 8 movable optical systems 20 disposed to confront the two recording surfaces of the optical discs 300. The optical disc mediums 300 are rotated by a motor 71 connected to the spindle 70. The 8 fixed optical systems 10 apply parallel beams to the movable optical systems 20 through glass windows 26. The beams reflected by the corresponding recording surfaces of the optical disc mediums 300 pass through the glass windows 26 before they return to the fixed optical system. The external dust invasion into the sealing case 2 can be prevented. The cross sectional portion at which the spindle 70 and the motor 71 are coupled to each other has a projections and a recessed groove so that the spindle 70 and the motor 71 can be attached/detached. As a result, only the sealing case 2 can be removed from the optical disc apparatus.

Figure 14:
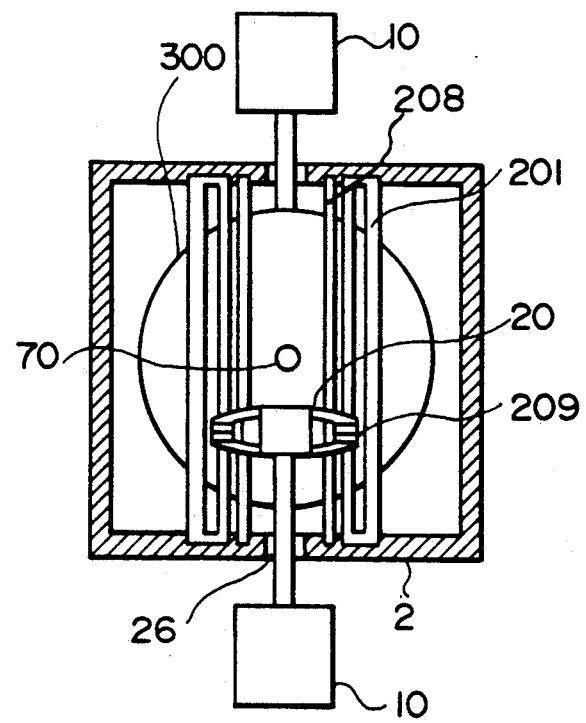
FIG. 14 illustrates the sealed stack type optical disc apparatus shown in FIG. 13 when viewed from the upper portion.

FIG. 14 illustrates the structure when viewed from the axis of the spindle 70, wherein each of the movable optical systems 20 is moved along the shaft 208 in the radial direction of the optical disc medium 300 by electromagnetic force generated by the actions of the coil 209 and the permanent magnet 201. The shaft 208 and the permanent magnet 201 are secured to the sealing case 2.

FIG. 15 illustrates the fixed optical system 10, the window 26, the movable optical system 20 and the optical disc medium 300. Laser beams emitted from the laser diode 121 are made to be parallel beams by the collimator lens 113 before they pass through the A/0 (Acoustic-Optical) deflector 114 and the beam splitter 116. Then, the parallel beams are emitted from the fixed optical system 10. The laser beam 6 passes through a glass 15 coupled to the window 26 before it is reflected by the mirror 210 secured to a movable frame 20' of the movable optical system 20. Then, the reflected laser beam 6 is diaphragmed on a recording film 319 of the optical disc medium 300 by the focusing lens 211. The optical disc medium 300 is manufactured in such a manner that the recording films (for example, a photo-electromagnetic film) 319 are evaporated to the two sides of an aluminum substrates 320, which have been ground. Furthermore, UV resin layers 323 are, as protection layers, applied to the same by a spin coating method, the UV resin layer 323 being arranged to be about 5 μm in thickness. The lens holder 222 for the focusing lens 211 is able to smoothly move in the direction of the optical axis of the focusing lens 211 while being positioned in contact with the movable frame 20'. When the disc 300 is rotated, an air flow layer the thickness of which is several μm is generated between the disc 300 and the lens holder (slider) 222. The thickness of the air flow layer can be adjusted by the elastic force of the spring 226. The focal depth of the spot can be arranged to be 3 μm or less by making the irregular thickness of the UV resin layer 323 to be 1 μm and the change in the thickness of the air flow layer to be 1 μm. Therefore, a desired accuracy in focusing for the above-described automatic focusing can be realized by combining the rough followup control and the fine followup control.

As shown in FIG. 16A, pits 325 and 326 for detecting the track deviation are previously and alternately formed to form projections or recesses along the direction of the forward movement of the track. The pits 325 and 326 are alternately formed by the same distances from a central line 324, which is designated by an alternate long and short dash line, of the track. When the central line 324 of the track is scanned by a spot, the quantity of reflected light from the disc 300 is, as designated by the line 329 of FIG. 16B, equally modulated by the pits 325 and 326. When the spot scans a position which is designated by an arrow 327 of FIG. 16A and which is deviated from the central line 324 of the track, the reflected light is modulated by a larger quantity by the pit 325 as designated by a line 330 of FIG. 16C. When the spot scans a position designated by an arrow 328 of FIG. 16A, the reflected light is modulated by a larger quantity by the pit 326 as designated by a line 331 of FIG. 16D. The reflected light from the disc 300, which has been modulated by the track deviation detection pits or the information recording marks, again passes the window 26 before it is reflected by the beam splitter 116 in the solid optical system 10. Then, the light is focused by a lens 134 before it is divided into an S-polarized and P-polarized light by the Wollaston prism 131. Then, the S-polarized and P-polarized light are respectively received by photo-detection devices 57 and 58. The signal 329, 330 or 331 described with reference to FIGS. 16A to 16D is obtained by adding the outputs from the photo-detection devices 57 and 58 by an addition circuit 137. Then, the signal thus obtained is subjected to a comparison with the level modulated by the pits 325 and 326 so that the track deviation detection signal is obtained. The A/0 deflector 114 is operated in response to the track deviation detection signal so that the beam 6 is deflected. As a result, the tracking control is performed. Furthermore, the photo-electromagnetic signal can be obtained by calculating, by a difference operator 136, the difference in the light quantity between the S-polarized light and P-polarized light divided by the Wollaston prism 131.

Figure 17:
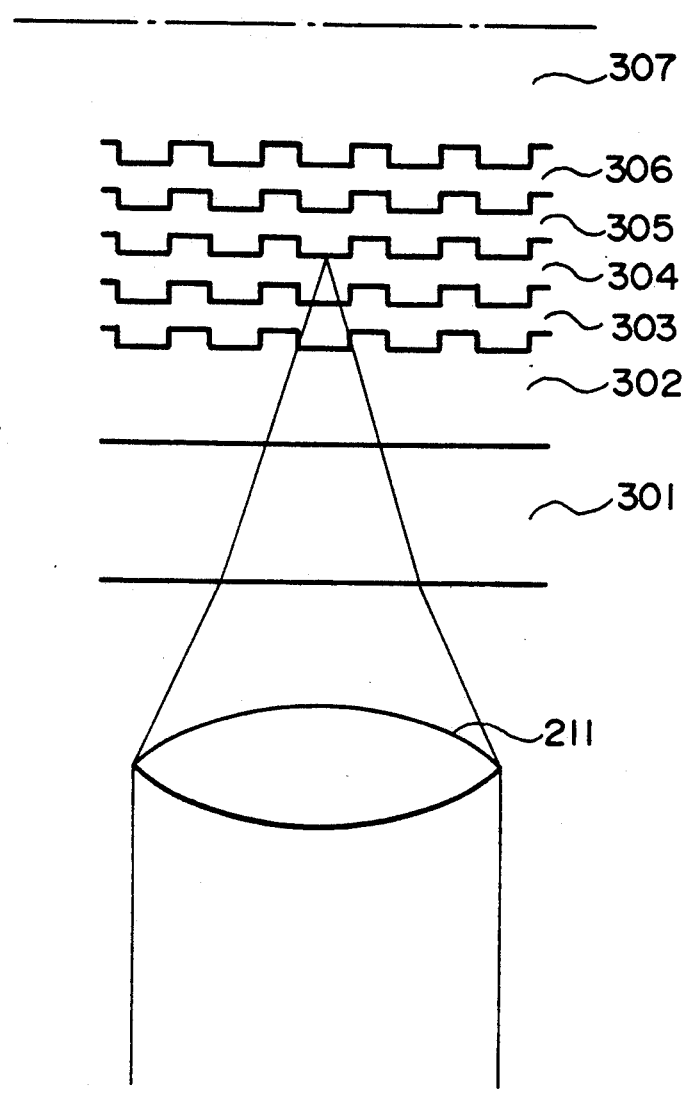
FIG. 17 is a cross sectional view which illustrates an example of the structure of an interchangeable optical disc medium.

Then, the optical disc medium (information storage medium) according to the present invention will now be described. FIG. 17 illustrates the structure of the reloadable optical disc medium. The reloadable optical disc medium is manufactured by applying an ultraviolet hardening resin 302 to a glass or an acrylic substrate 301 the thickness of which is about 1.2 mm. Then, the track guide groove 40 (see FIG. 6), prewobble pits 325 and 326 (see FIG. 16) and preformat signals such as an address signal are formed by using a duplicated mold or the like. Then, a metal reflecting film 303 made of Al or Au, an inorganic base film 304 made of $SiO_2$ or the like, a photo-electromagnetic or phase change recording film 305 and an inorganic protection film 306 made of $SiO_2$ or the like are successively formed on the hardening resin 302. In a case of a single-sided recording medium, a glass plate or an acrylic plate is further bonded. In a case of a double-sided recording medium, two substrates 301 on which the recording films 305 are formed are bonded by the ultra-violet hardening resin 307 while allowing the recording films 305 to confront each other so as to form a symmetrical structure.

Information can be recorded/reproduced by diaphragming the light spot of the diffraction limit on to the recording film 305 by an objective lens 211. The reason why light is focused onto the recording film 305 via the glass plate or the acrylic substrate 301 the thickness of which is about 1 mm lies in that the influence of dust adhered to the surface on which the light is made incident (the surface of the glass plate or the acrylic substrate) is reduced since light is not diaphragmed at the above-described surface.

Figure 18:
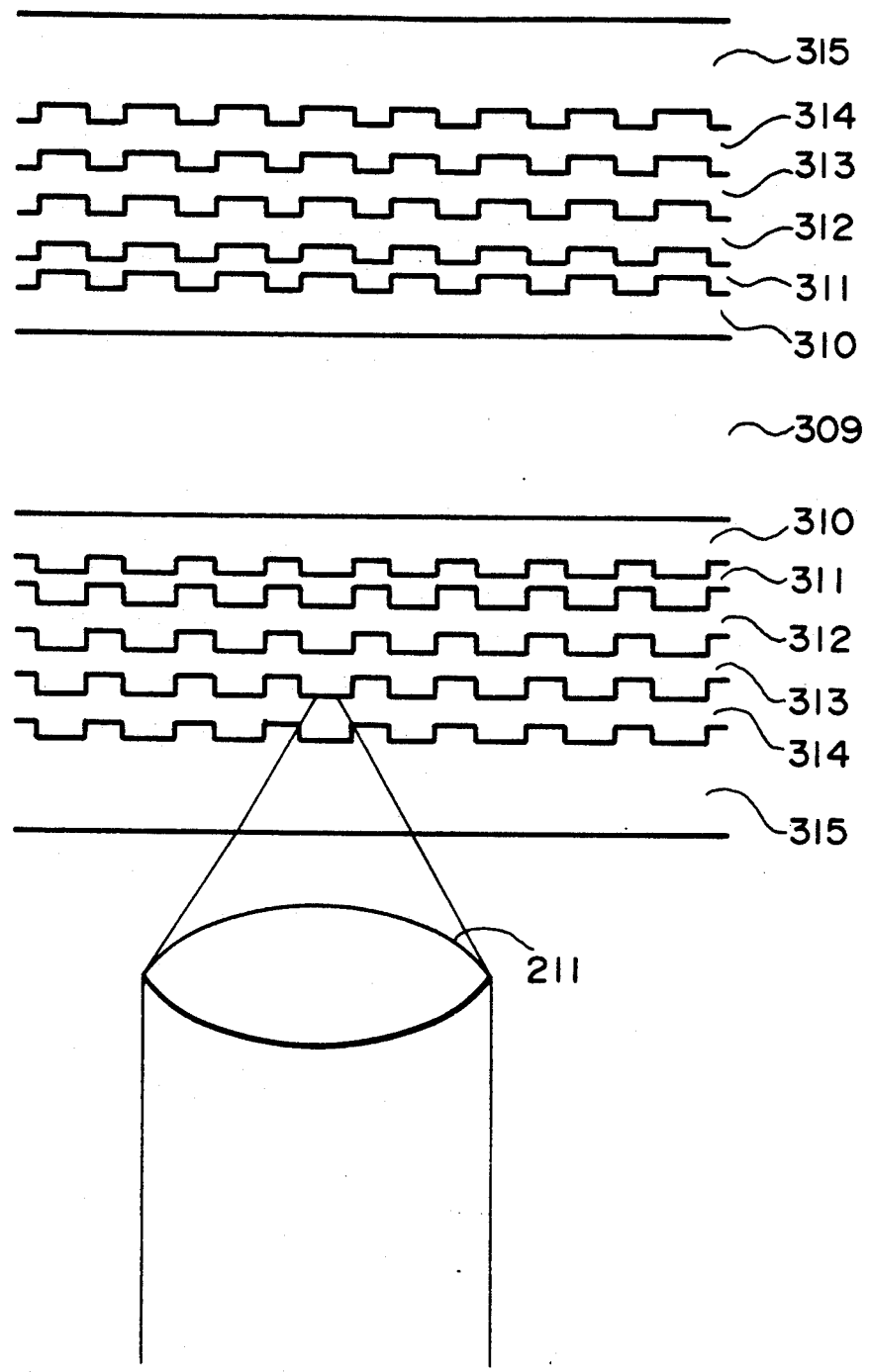
FIG. 18 is a cross sectional view which illustrates an embodiment of an information recording medium (optical disc medium) preferred for use in the sealed stack type optical disc apparatus according to the present invention.

FIG. 18 illustrates the structure of an optical information storage medium (optical disc medium) which can be suitably employed in the sealed stack type optical disc apparatus shown in FIG. 13. The difference from the storage medium shown in FIG. 17 lies in that the substrate 301 the thickness of which is 1.2 mm and which serves as the protection cover is replaced by a structure in which a thin organic resin layer 315 is applied. Then, the structure and the manufacturing method therefor will now be described.

An ultraviolet resin 310 is applied to an aluminum or glass substrate 309 before a track guide groove 40 (see FIG. 6) or prewobble pits 325 and 326 (see FIG. 16) and preformat signals such as address signals are formed by a duplication mold or the like. Furthermore, a metal reflecting layer 311 made of Al or Au, an inorganic base film 312 made of $SiO_2$, a photo-electromagnetic or phase change recording film 313 and an inorganic protection film 314 made of $SiO_2$ or the like are successively formed. Furthermore, a diluted organic matter such as an ultraviolet hardening resin (for example, trade mark "SD17" manufactured by Dai-Nippon Ink & Chemicals, Inc.) is applied by spin-coating so that an organic protection film 315 is formed. Thus, the above-described layers are symmetrically formed on both sides of the substrate 309. It is easy to form the organic protection coat 315 the thickness of which is 5 $\mu m$ to 20 $\mu m$ by applying the diluted organic matter. However, it can be applied by properly determining the viscosity of the diluted organic matter or the spinning speed. Since a free surface is formed in the case of employing the spin coating method, the protection film 315 is able to have a flatness of 0.1 $\mu m$ or less, that is, a flatness of the level below one-fifth of the wavelength of the laser beam.

The above-described degree of the flatness is sufficient to prevent the deterioration in the quality of the light spot. The flat organic protection film 315 may be formed by a casting method by using a glass mold. In the case where Al is employed to form the substrate, it is preferable that an anti-reflection film be formed on the surface of the aluminum substrate, the antireflection film corresponding to the wavelength of the laser beam.

The thickness of the organic protection film 315 is determined in accordance with the size of the dust which depends on the filtering performance of an air cleaning filter disposed in the optical disc apparatus. For example, in a case where a cloth filter capable of removing dust the particle size of which is about 1 $\mu m$ is used, the thickness of the coating is arranged to be 10 $\mu m$ or more which is 10 times or larger the particle size of the dust. In a case where a high efficiency particulate air filter capable of removing dust the particle size of which is about 0.3 $\mu m$ is used, the thickness of the coating is arranged to be 3 $\mu m$ or more which is ten times or more the particle size of the dust. The optical disc medium may be arranged to be a solid type, a sealed type or a detachable type such as a disc pack for each of the spindles.

When information is recorded by an optical information storage medium according to this embodiment and a separation type optical head arranged to use an objective lens the NA of which is 0.65 and a laser diode the wavelength of which is 780 nm are used, recording marks (pits or domains) of about 0.75 $\mu m$ can stably be recorded/reproduced. Furthermore, the error rate is not raised by dust.

The invention has been described with reference to the preferred and alternate embodiments. Obviously modifications and alterations will occur to those of ordinary skill in the art upon reading and understanding the present invention. It is intended that the invention be construed as including all such modifications and alterations in so far they come with the scope of the appended claims or the equivalent thereof.

We claim:

1. A separation type optical head comprising:
a fixed optical system including light source means for emitting a light beam, optical means for receiving the light beam from the light source means and producing at least one collimated beam from the received light beam, and photo-detection means for detecting at least one light beam reflected from a recording surface of an optical disc medium;
a movable optical system including focusing means for focusing the at least one collimated beam from the optical means onto the recording surface to form a spot on the recording surface, and spot control means for at least controlling a position of the spot on the recording surface;
a fixed frame in which at least the movable optical system is disposed; and
moving means for moving the movable optical system relative to the fixed optical system in a radial direction of the optical disc medium;
wherein a first opening is formed in a first surface of the fixed frame confronting the recording surface, the first opening being elongated in the radial direction of the optical disc medium and being covered by a transparent member.

2. A separation type optical head according to claim 1, wherein the photo-detection means outputs a focal point deviation detection signal in response to the detected at least one light beam, and wherein the spot control means includes an actuator for moving the focusing means in a direction of an optical axis of the focusing means in response to the focal point deviation detection signal to adjust a focal point of the focusing means.

3. A separation type optical head according to claim 1, wherein the movable optical system and the fixed optical system are disposed in the fixed frame, and wherein a second opening is formed in a second surface of the fixed frame confronting an air flow produced by rotation of the optical disc medium and a third opening is formed in a third surface of the fixed frame, at least the second opening being provided with a filter.

4. A separation type optical head according to claim 1, further comprising magnetic field applying means for applying a magnetic field to the recording surface, the magnetic field applying means being disposed around the first opening.

5. A separation type optical head according to claim 1, wherein at least the movable optical system and the fixed optical system are disposed in the fixed frame.

6. A separation type optical head according to claim 1, wherein at least the movable optical system is hermetically sealed in the fixed frame.

7. A stack type optical disc apparatus comprising:
a plurality of optical disc mediums arranged for simultaneous rotation, each having at least one recording surface; and
a plurality of separation type optical heads, each of the plurality of separation type optical heads being associated with a respective recording surface of a respective optical disc medium of the plurality of optical disc mediums and comprising:
a fixed optical system including light source means for emitting a light beam, optical means for receiving the light beam from the light source means and producing at least one collimated beam from the received light beam, and photo-detection means for detecting at least one light beam reflected from the recording surface;
a movable optical system including focusing means for focusing the at least one collimated beam from the optical means onto the recording surface to form a spot on the recording surface, and spot control means for at least controlling a position of the spot on the recording surface;
a fixed frame in which at least the movable optical system is disposed; and
moving means for moving the movable optical system relative to the fixed optical system in a radial direction of the optical disc medium;
wherein a first opening is formed in a first surface of the fixed frame confronting the recording surface, the first opening being elongated in the radial direction of the optical disc medium and being covered by a transparent member.

8. A stack type optical disc apparatus according to claim 7, wherein the photo-detection means outputs a focal point deviation detection signal in response to the detected at least one light beam, and wherein the spot control means includes an actuator for moving the focusing means in a direction of an optical axis of the focusing means in response to the focal point deviation detection signal to adjust a focal point of the focusing means.

9. A stack type optical disk apparatus according to claim 7, wherein the movable optical system and the fixed optical system are disposed in the fixed frame, and wherein a second opening is formed in a second surface of the fixed frame confronting an air flow produced by rotation of the optical disc medium and a third opening is formed in a third surface of the fixed frame, at least the second opening being provided with a filter.

10. A stack type optical disc apparatus according to claim 7, further comprising magnetic field applying means for applying a magnetic field to the recording surface, the magnetic field applying means being disposed around the first opening.

11. A stack type optical disc apparatus according to claim 7, wherein each recording surface of the plurality of optical disc mediums is provided with a guide groove extending in a circumferential direction of the recording surface, and wherein the spot control means controls the position of the spot on the recording surface on the basis of the guide groove.

12. A stack type optical disc apparatus according to claim 7, wherein each recording surface of the plurality of optical disc mediums is provided with pits alternately disposed on opposite sides of a track extending in a circumferential direction of the recording surface, and wherein the spot control means controls the position of the spot on the recording surface on the basis of the pits.

13. A stack type optical disc apparatus according to claim 7, wherein at least the movable optical system and the fixed optical system are disposed in the fixed frame.

14. A stack type optical disc apparatus according to claim 7, wherein at least the movable optical system is hermetically sealed in the fixed frame.

15. A separation type optical head comprising:
a fixed optical system including light source means for emitting a light beam, optical means for receiving the light beam from the light source means and producing at least one collimated beam from the received light beam, and photo-detection means for detecting at least one light beam reflected from a recording surface of an optical disc medium;
a movable optical system including focusing means for focusing the at least one collimated beam from the optical means onto the recording surface to form a spot on the recording surface, and rough focal point adjusting means for performing a rough adjustment of a focal point of the focusing means by causing the focusing means to float above the recording surface on an air flow layer produced by rotation of the optical disc medium;
a frame in which at least the movable optical system is disposed; and
moving means for moving the movable optical system relative to the fixed optical system in a radial direction of the optical disc medium;
wherein the fixed optical system is not disposed in the frame.

16. A separation type optical head according to claim 15, wherein the photo-detection means outputs a track deviation detection signal in response to the detected at least one light beam, and further comprising tracking adjusting means for at least controlling a position of the spot on the recording surface in response to the track deviation detection signal to cause the spot to track along a track on the recording surface.

17. A separation type optical head according to claim 16, wherein the light source means, the focusing means, and the recording surface cooperate to perform a fine adjustment of the focal point of the focusing means on the basis of an automatic focusing effect occurring due to a change in a wavelength of the light beam emitted from the light source means.

18. A separation type optical head according to claim 17, wherein the tracking adjusting means includes an acousto-optical deflection device for deflecting the light beam emitted from the light source means in response to the track deviation detection signal to control the position of the spot on the recording surface.

19. A separation type optical head according to claim 16, wherein the optical means includes a relay lens optical system from which the at least one collimated beam is emitted to the movable optical system.

20. A separation type optical head according to claim 19, wherein the photo-detection means also outputs a focal point deviation detection signal in response to the detected at least one light beam, and wherein the tracking adjusting means includes means for moving at least one lens of the relay lens optical system in a direction of an optical axis of the at least one lens in response to the focal point deviation detection signal to perform a fine adjustment of the focal point of the focusing means.

21. A separation type optical head according to claim 19, wherein the tracking adjusting means includes means for moving at least one lens of the relay lens optical system in a direction perpendicular to an optical axis of the at least one lens in response to the track deviation detection signal to control the position of the spot on the recording surface.

22. A separation type optical head according to claim 15, wherein at least the movable optical system is hermetically sealed in the frame.

23. A stack type optical disc apparatus comprising:
a plurality of optical disc mediums arranged for simultaneous rotation, each having at least one recording surface; and
a plurality of separation type optical heads, each of the plurality of separation type optical heads being associated with a respective recording surface of a respective optical disc medium of the plurality of optical disc mediums and comprising:
a fixed optical system including light source means for emitting a light beam, optical means for receiving the light beam from the light source means and producing at least one collimated beam from the received light beam, and photo-detection means for detecting at least one light beam reflected from a recording surface of an optical disc medium;
a movable optical system including focusing means for focusing the at least one collimated beam from the optical means onto the recording surface to form a spot on the recording surface, and rough focal point adjusting means for performing a rough adjustment of a focal point of the focusing means by causing the focusing means to float above the recording surface on an air flow layer produced by rotation of the optical disc medium;
a frame in which at least the movable optical system is disposed; and
moving means for moving the movable optical system relative to the fixed optical system in a radial direction of the optical disc medium;
wherein the fixed optical system is not disposed in the frame.

24. A stack type optical disc apparatus according to claim 23, wherein the movable optical system is disposed in the frame and the fixed optical system is not disposed in the frame, and wherein the frame is provided with a window through which the at least one collimated beam is transmitted from the fixed optical system to the movable optical system.

25. A stack type optical disc apparatus according to claim 23, wherein the photo-detection means outputs a track deviation detection signal in response to the detected at least one light beam, and further comprising tracking adjustment means for at least controlling a position of the spot on the recording surface in response to the track deviation detection signal to cause the spot to track along a track on the recording surface.

26. A stack type optical disc apparatus according to claim 25, wherein the light source means, the focusing means, and the recording surface cooperate to perform a fine adjustment of the focal point of the focusing means on the basis of an automatic focusing effect occurring due to a change in a wavelength of the light beam emitted from the light source means.

27. A stack type optical disc apparatus according to claim 26, wherein the tracking adjusting means includes an acousto-optical deflection device for deflecting the light beam emitted from the light source means in response to the track deviation detection signal to control the position of the spot on the recording surface.

28. A stack type optical disc apparatus according to claim 25, wherein each recording surface of the plurality of optical disc mediums is provided with pits alternately disposed on opposite sides of a track extending in a circumferential direction of the recording surface, and wherein the tracking adjusting means controls the position of the spot on the recording surface on the basis of the pits.

29. A stack type optical disc apparatus according to claim 25, wherein the optical means includes a relay lens optical system from which the at least one collimated beam is emitted to the movable optical system.

30. A stack type optical disc apparatus according to claim 29, wherein the photo-detection means also outputs a focal point deviation detection signal in response to the detected at least one light beam, and wherein the tracking adjustment means includes means for moving at least one lens of the relay lens optical system in a direction of an optical axis of the at least one lens in response to the focal point deviation detection signal to perform a fine adjustment of the focal point of the focusing means.

31. A stack type optical disc apparatus according to claim 23, wherein each of the plurality of optical disc mediums includes a substrate, an information recording film supported by the substrate, and an inorganic protection film formed on the recording film, wherein a distance between a surface of the recording film and the recording surface of the optical disc medium is 1 $\mu$m to 100 $\mu$m.

32. A stack type optical disc apparatus according to claim 31, wherein each of the plurality of optical disc mediums further includes an organic protection film formed on the inorganic protection film.

33. A stack type optical disc apparatus according to claim 31, wherein the recording surface of the optical disc medium has a flatness no greater than $\lambda/5$, wherein $\lambda$ is a wavelength of the light beam emitted from the light source means.

34. A stack type optical disc apparatus according to claim 23, wherein at least the movable optical system is hermetically sealed in the frame.

* * * * *